United States Patent [19]

Frizot

[11] Patent Number: 4,968,201

[45] Date of Patent: Nov. 6, 1990

[54] ADAPTOR FOR SCREWING OR UNSCREWING THREADED CONNECTION ELEMENTS

[75] Inventor: Alain Frizot, Montcenis, France

[73] Assignee: Framatome, Courbevoie, France

[21] Appl. No.: 447,753

[22] Filed: Dec. 8, 1989

[30] Foreign Application Priority Data

Dec. 9, 1988 [FR] France .................... 88 16263

[51] Int. Cl.$^5$ ............................................. F16B 37/08
[52] U.S. Cl. ..................................... 411/366; 411/404; 411/432
[58] Field of Search ................ 411/6, 7, 432, 433, 411/402, 403, 404, 407, 911, 366; 403/307; 81/60, 63.1, 125, 451

[56] References Cited

U.S. PATENT DOCUMENTS

| 1,421,792 | 7/1922 | Linden ........................... 81/63.1 |
| 1,549,041 | 8/1925 | Berg . |
| 2,685,812 | 8/1954 | Dmitroff .......................... 411/7 |
| 3,555,491 | 1/1971 | Moss .............................. 411/7 |
| 4,618,299 | 10/1986 | Bainbridge et al. . |
| 4,648,293 | 3/1987 | McCauley . |

FOREIGN PATENT DOCUMENTS

| 1272351 | 10/1960 | France . |
| 628563 | 3/1982 | Switzerland . |
| 125298 | 4/1919 | United Kingdom . |
| 143984 | 6/1920 | United Kingdom . |

Primary Examiner—Neill R. Wilson
Attorney, Agent, or Firm—Pollock, Vande Sande & Priddy

[57] ABSTRACT

The adaptor comprises a nut (2) screwed onto the end of the connection element (1) and interacting with a two-way connector (4) adapted to ensure the connection between a screwing or unscrewing member and the connection element (1), an arrangement between the nut (2) and the connector (4) allowing the connector (4) to rotate in only one direction, and a spring insert (44) for the elastic support of the connector (4) on the end of the connection element (1).

9 Claims, 2 Drawing Sheets

4,968,201

ADAPTOR FOR SCREWING OR UNSCREWING THREADED CONNECTION ELEMENTS

FIELD OF THE INVENTION

The present invention relates to an adaptor for screwing or unscrewing a threaded connection element inserted between the opposing ends of an automatic screwing or unscrewing member and the threaded connection element.

BACKGROUND OF THE INVENTION

For screwing or unscrewing threaded connection elements, and more particularly large connection elements such as bolts, automatic means such as screwing and unscrewing robots are generally used.

The unscrewing operation is usually carried out by fastening the rod of a traction jack onto the free part of the connection element and then exerting, via the jack, a tensile force on the connection element so as to cause the said element to elongate, which subsequently pulls the tightening nut with it so as to move it away from the bearing face. The connection element is then driven in rotation in the opposite direction of the thread line by a screwing and unscrewing robot.

The first stage of the unscrewing, which consists in unlocking the connection element, is often the most awkward, and it is at the beginning of this stage that certain difficulties appear.

These difficulties may result from the threads becoming clogged up, and from a mechanical stiff point.

In the first case, it is evident that, in order to act effectively, an unscrewing torque must be exerted of a value greater than that initially provided.

This state of affairs entails, in the region of the connection between the traction jack and the connection element, additional and therefore parasitic forces, the effect of which is to further the slipping, either intermittent or permanent, of the said connection.

In the second case, the situation is particularly awkward. The occurrence of the mechanical stiff point may be caused either by the presence of an isolated stiff body lodged between the threads or by the creep caused by an excessive tightening force or, alternatively, a force during operation.

Whatever the type of anomaly to be eliminated, the means employed up until now do not enable the problem to be effectively overcome and generally require a fairly long service time, which can be prejudicial to the safety of the personnel charged with these services, since they may be performed in an area which has often been rendered dangerous by it being subjected to high doses of radiation or to chemical pollution.

SUMMARY OF THE INVENTION

The object of the invention is therefore to provide an adaptor for screwing or unscrewing threaded connection elements avoiding the above mentioned disadvantages and enabling, by its design, a very short service time for its installation, while at the same time offering the possibility of carrying out permanent service to modify accurately the effectiveness of the tightening in order to intensify or to relax the tension on the threaded connection element.

According to the invention, the adaptor for screwing or unscrewing the threaded connection element is comprises a nut screwed onto the end of the connection element and interacting with a two-way connector adapted to ensure the connection between a screwing or unscrewing member and the said connection element, self-locking in rotation means between the said nut and the said connector, and means for the elastic support of the connector on the end of the connection element.

According to other features of the invention:

the nut is pierced axially right through with an orifice formed from a succession of different profiles carrying out particular functions, the orifice of the nut has, in the bottom part, an internal screw thread intended to be screwed onto the threaded end of the connection element, in the median part a stop with an annular cross-section perpendicular to the axis of the said orifice and, in the top part, a guard casing equipped with a central cut-out, the two-way connector has, successively from bottom to top, an internal bore adapted to the end of the connection element, an outer annular stop, an outer toothed ring, and means for connection to the screwing or unscrewing member, the self-locking means consist of at least one catch set radially in the thickness of the wall of the nut and interacting with the toothed ring of the connector, the end of the catch has the form of a tooth, the profile of which corresponds to the teeth of the ring, the means for the elastic support of the connector on the end of the connection element consist of a spring insert.

BRIEF DESCRIPTION OF THE DRAWINGS

The invention will be better understood with the aid of the following description of an embodiment of the invention given by way of example and made with reference to the attached drawings, in which.

DESCRIPTION OF THE PREFERRED EMBODIMENT

Figure 1:
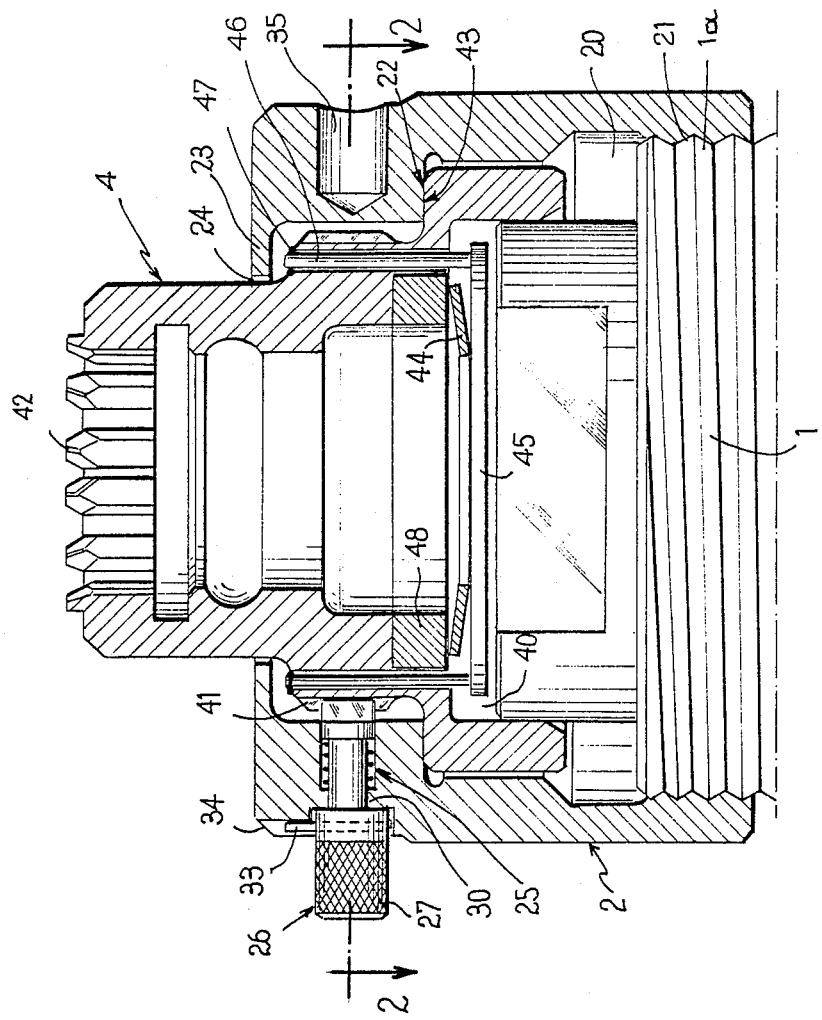
FIG. 1 is a longitudinal cross-sectional view of the adaptor according to the invention.
Figure 2:
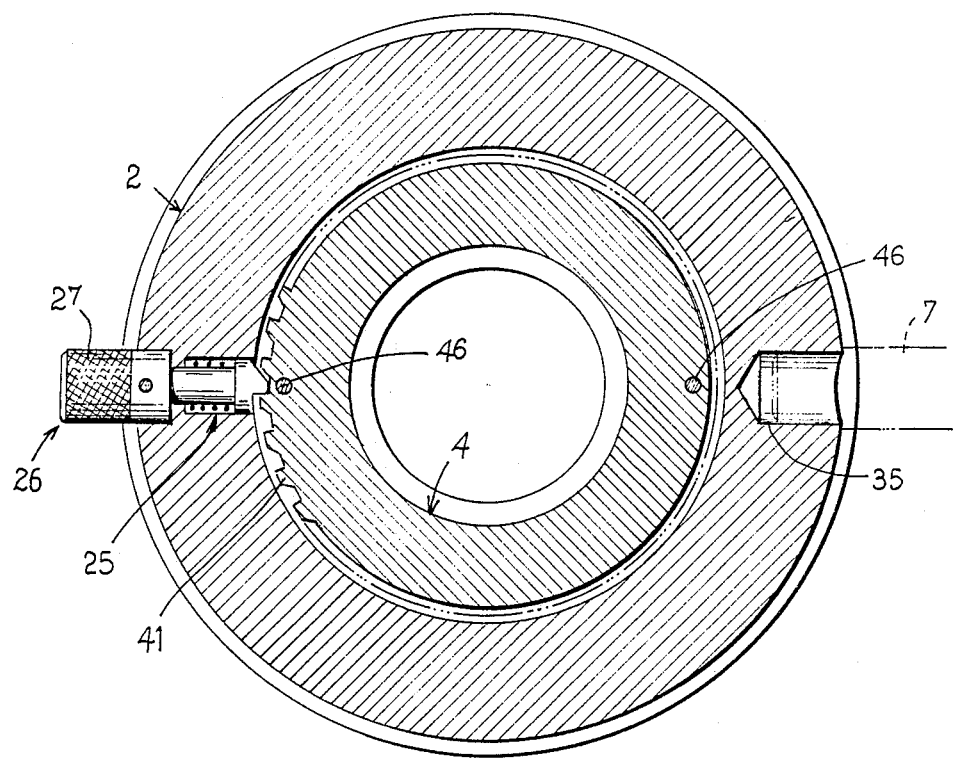
FIG. 2 is a cross-sectional view along the line 2—2 in FIG. 1.

The device according to the invention, as shown in FIGS. 1 and 2, is used to make the connection between an automatic screwing or unscrewing member (not shown) and a threaded connection element, more particularly a large element consisting, for example, of a bolt 1.

The adaptor is formed from a nut 2 produced from a block and thus exhibiting a high degree of resistance.

This nut is pierced axially right through with an orifice 20 formed from a succession of different profiles carrying out particular functions.

The orifice 20 thus has, in the lower part, an internal screw thread 21 intended to be screwed onto the threaded end 1a of the bolt 1, in the median part of a stop 22 with an annular cross-section perpendicular to the axis of the said orifice and, in the top part, a guard housing 23 equipped with a central cut-out 24.

Figure 3:
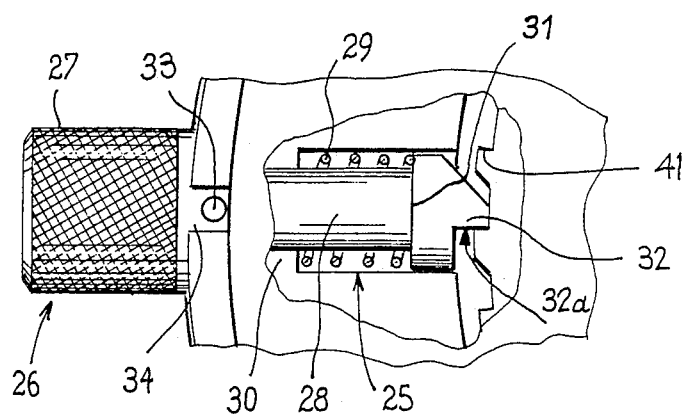
FIG. 3 is a view, on a larger scale, of the catch with which the adaptor according to the invention is fitted.

The nut 2 moreover has, in its top part, a bore 25 perpendicular to the axis of the orifice 20 and in which a catch 26, shown on a larger scale in FIG. 3, is set radially. This catch 26 has a knurled knob 27 which is extended by a shaft 28 housed in the bore 25. A spring 29, one end of which bears against a fixed stop 30 formed by a shoulder of the bore 25 and the other end of which bears against a moveable stop 31 formed by the head of the shaft 28, is placed on the shaft 28.

The end of the head 31 of the shaft 28 is in the form of a tooth 32 having an engagement face 32a.

The catch 26 is held in the vertical position by a pin 33 housed in a recess 34 provided in the periphery of the nut 2.

At virtually the same level as the bore 25, the nut 2 has a set of symmetrically distributed blind holes 35 enabling the end 7 of a control device, adjusted according to a predetermined tightening torque, to be engaged (FIG. 2).

The adaptor also consists of a two-way connector 4 provided at its base with a female housing 40 compatible with the shape of the end of the bolt 1. This housing consists, for example, of a semi-circular bore having at least two parallel plane faces.

The median part of the connector 4 is provided with a peripheral toothing 41 cut from a block and intended to receive the tooth 32 of the catch 26. The top part of this connector has an appropriate machined piece 42 connecting a screwing or unscrewing member (not shown) to an adaptor.

The connector 4 also has an outer annular stop 43 intended to receive the annular face of the stop 22 of the nut 2.

Lastly, the connector 4 has, inside the housing, elastic-support means on the end of the bolt 1.

These means consist of a spring insert 44 formed either from resilient spring washers piled in a predetermined chosen arrangement or from a compression spring held in the housing 40 by a plate 45 suspended via two rods 46 which are themselves held relative to the connector 4 via, for example, clips or pins 47.

A washer with an adjustable thickness 48 may be inserted between the spring insert 44 and the base of the housing 40 depending on the number of resilient washers, and therefore on the desired force. The main purpose of these elastic-support means is to protect the end of the bolt 1 from possible caulking.

The installation of the adaptor is carried out entirely by hand and is performed, for example, during the operation of disassembling the bolt 1.

Firstly, the connector 4, equipped with its various elements such as the elastic-support means, is positioned on the end of the bolt 1 and is rotated about its axis such that the housing 40 engages on the profiled end of the bolt 1.

Before mounting the nut 2, the catch 26 is pulled out and locked in the rear position by rotating the knurled knob 27 to bring the pin 33 into the horizontal position bearing against the outside of the vertical recess 34.

The nut 2 is then engaged on the connector 4 and rests against the threaded end 1a of the bolt 1. The nut 2 is screwed, using the control device 7, until the annular face of the stop 22 bears against the annular stop 43 of the connector 4.

The catch 26 is set to the active position by rotating the knurled knob 27 so that the pin 33 is housed in the vertical position in the recess 34. The return spring 29 acts axially upon the head 31 of the shaft 28 with a force which is sufficient to enable the tooth 32 to engage with the peripheral toothing 41 of the connector 4.

Tightening is completed by rotating the nut 2 by a fraction of a rotation using the control device 7. As soon as this rotation begins, the catch 26 jumps into a recess of the peripheral toothing 41 and thus fulfills its anti-return function.

The control device 7 is withdrawn and from now on the screwing and unscrewing member may be engaged on the end of the connector 4 and this screwing and unscrewing member may be operated.

The first stage of the unscrewing, which consists in unlocking the bolt 1, is the most awkward.

For this stage, the screwing and unscrewing member circulates vertical vibrations, the frequencies of which are high and can in no way give rise to a horizontal force capable of causing the tooth 32 of the catch 26 to jump out of the peripheral toothing 41.

Consequently, the vibrations pass directly from the connector 4 to the bolt 1 by way of their contact faces and reach the other screwed end of the bolt 1.

Unscrewing can be carried out only in the region of the screwed end of the bolt and not the connector 4—bolt 1 connection in view of the self-locking means between the connector 4 and the nut 2 screwed onto the bolt 1.

The adaptor according to the invention thus enables the passage of vertical vibrations without interruption and without any risk of loosening in the region of the screw threads of the coupling and, by its design, requires a very short service time for its installation.

In addition, it offers the possibility of being able to carry out permanent service in order to modify accurately the effectiveness of the tightening so as to either intensify or relax the tension of the connection.

An adaptor of this type may be employed for mounting shafts or large tubes rigidly end to end, enabling the passage of both a torque and a substantial axial force.

It may also be employed as a radial stop in a stack of components where there is a concatenation of ball bearings and washers, resilient or otherwise, with the possibility of taking up the wear.

I claim:

1. Adaptor for screwing or unscrewing threaded connection elements (1), said adaptor comprising a nut (2) screwed onto an end of a connection element (1) and interacting with a connector (4) adapted to ensure a connection between a screwing or unscrewing member and said connection element (1), means (26, 41) between said nut (2) and said connector (4) permitting said connector (4) to rotate in one direction but preventing rotation of said connector in an opposite direction, and means (44) for elastic support of said connector (4) on said end of said connection element (1).

2. Adaptor according to claim 1, wherein said nut (2) is pierced axially right through by an orifice (20) having a plurality of different profiles adapted to carry out different functions.

3. Adaptor according to claim 1, wherein said orifice (20) comprises an internally screw-threaded lower part adapted to be screwed onto the threaded end of said connection element (1), a middle part comprising a stop with an annular cross-section (22) perpendicular to an axis of said orifice (20), and a top part comprising a guard casing (23) with a central cut-out (24).

4. Adaptor according to claim 1, wherein said two-way connector (4) has, successively from bottom to top, an internal bore (40) adapted to an end of said connection element (1), an outer annular stop (43), an outer toothed ring (41), and means for connection (42) to said screwing or unscrewing member.

5. Adaptor according to claim 4, wherein said self-locking means consist of at least one catch (26) set radially in a thickness of a wall of said nut (2) and interacting with said toothed ring (41) of said connector (4).

6. Adaptor according to claim 5, wherein an end of said catch (26) has the form of a tooth (32) the profile of which corresponds to teeth of said outer toothed ring (41).

7. Adaptor according to claim 1, wherein said means for elastic support of said connector (4) on the end of said connection element (1) consist of a spring insert (44).

8. Adaptor according to claim 7, wherein said spring insert (44) consists of a stack of spring washers held in place by a plate (45) suspended inside said connector (4).

9. Adaptor according to claim 7, wherein said spring insert (44) consists of a compression spring held in place by a plate (45) suspended inside said connector (4).

* * * * *